United States Patent [19]
Dewey et al.

[11] Patent Number: 5,864,655
[45] Date of Patent: Jan. 26, 1999

[54] MANAGING REMOVABLE MEDIA IN RAID AND RAIL ENVIRONMENTS

[75] Inventors: Douglas William Dewey; Rodney Jerome Means, both of Tucson, Ariz.

[73] Assignee: International Business Machines Corporation, Armonk, N.Y.

[21] Appl. No.: 709,970

[22] Filed: Sep. 9, 1996

[51] Int. Cl.$^6$ ................................................. G06F 13/00
[52] U.S. Cl. .................. 395/182.05; 395/183.18; 395/185.05; 395/185.07; 371/40.2; 371/49.1
[58] Field of Search ................ 395/182.03, 182.04, 395/185.02, 183.18, 185.01, 185.05, 185.07; 371/21.6, 49.1, 40.4, 69.1, 40.2

[56] References Cited

U.S. PATENT DOCUMENTS

| | | | |
|---|---|---|---|
| 5,124,987 | 6/1992 | Milligan et al. | 371/10.1 |
| 5,375,128 | 12/1994 | Menon et al. | 371/40.1 |
| 5,412,668 | 5/1995 | Dewey | 371/40.1 |
| 5,450,384 | 9/1995 | Dahmen et al. | 369/30 |
| 5,497,457 | 3/1996 | Ford | 395/182.04 |
| 5,504,858 | 4/1996 | Ellis et al. | 395/182.04 |
| 5,530,850 | 6/1996 | Ford et al. | 395/600 |
| 5,583,876 | 12/1996 | Kakata | 371/40.4 |
| 5,636,359 | 6/1997 | Beardsley et al. | 395/449 |

OTHER PUBLICATIONS

Dentsch, J.K. et al., "Physical Volume Library Deadlock A Distance in a Striped Media Environment, " Mass Storage Systems, 14$^{th}$ IEEE Symposium, pp. 54–64, 1995.

Drapeau, A.L. et al., "Stripping in Large Tape Libraries," ACM pp. 378–386, 1993.

Drapeau, A.L. et al, "Stripped Tape Arrays," 12$^{th}$ IEEE Symposium on Mass Storage, pp. 257–265, 1993.

Daniel Stodolsky, "Parity Logging in Redundant Disk Arrays", IEEE pp. 64–75, 1993.

Hoagland, A.S., "Magnetic Disk Storage Technology the First Century," Computer Conference Spring 1992, IEEE Computer Society International, pp. 407–409, 1992.

Ross, B. et al., "Volume Management by the Book: The NAStore Volume Manager," Mass Storage Sys., 1991 11$^{th}$ IEEE Symposium, 1991.

Chen, M. Peter, et al., "ACM Computing Surveys," ACM Press vol. 26 No. 2, Jun. 1994, pp. 164–165.

J. McIlvain, et al., "Raid with NVRAM for Parity and/or Data" Jun., 1995, IBM Tech. Discl. Bulleting, vol. 38, No. 6, pp. 545–547.

J. Menon et al., "Distributed Sparing in Disk Arrays" 1992 IEEE, pp. 410–421.

J. Menon, et al. "The architecture of a Fault–Tolerant Cached RAID Controlled" 1993 IEEE, pp. 76–86.

D. Stodolsky, et al., "Parity–Logging Disk Arrays" ACM Transactions on Computer Systems, vol. 12, No. 3, Aug. 1994, pp. 206–235.

*Primary Examiner*—Robert W. Beausoliel, Jr.
*Assistant Examiner*—Norman M. Wright
*Attorney, Agent, or Firm*—Robert M. Sullivan; D. A. Shifrin

[57] ABSTRACT

Parity updates are performed in an efficient manner after data is modified on removable media in a RAID or RAIL array, within or outside the array, without requiring that all of the data on all of media in a parity group be read. Instead, a list is maintained identifying those blocks of data were which modified on the media. Only the corresponding blocks on the remaining media in the parity group are read to calculate the new parity. Alternatively, a list can be maintained identifying the bits which were changed on the media. Consequently, only the corresponding bits of the parity block(s) need be changed.

12 Claims, 5 Drawing Sheets

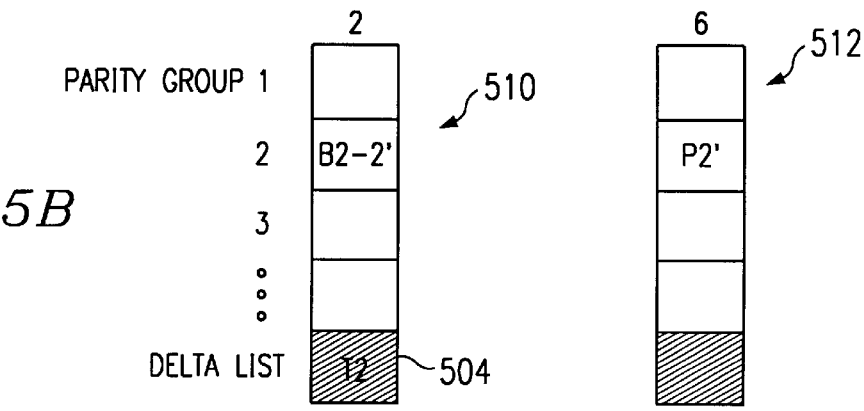
FIG. 5B
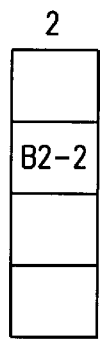
FIG. 6A
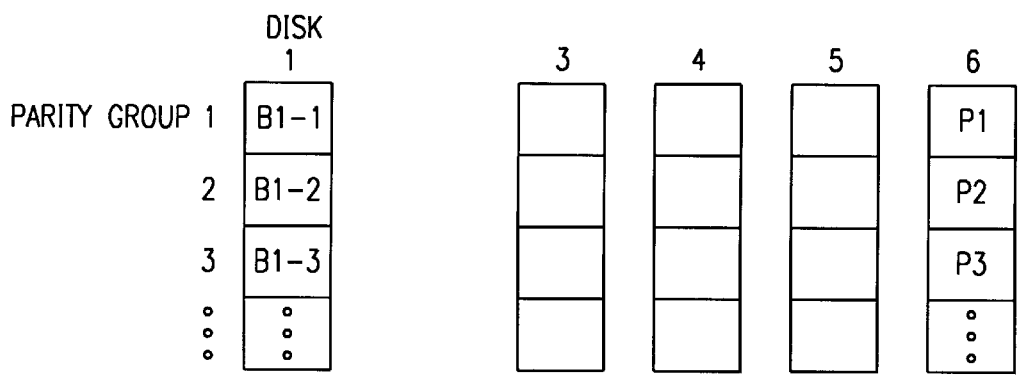
FIG. 6B
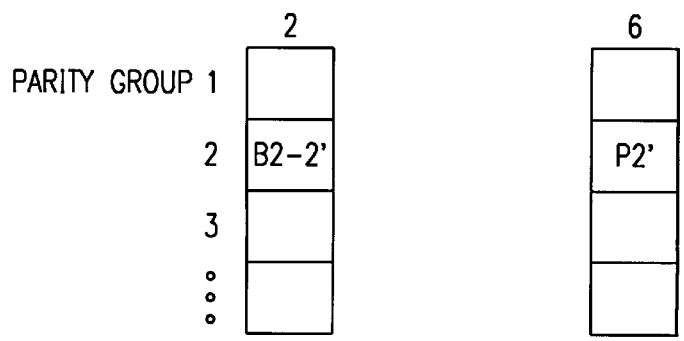

| | | |
|---|---|---|
| $B_{1-2}$ | 1 0 1 1 0 1 0 0 0 1 1 1 0 0 1 0 | ↙510 |
| $B_{2-2}$ | 1 0 0 1 0 1 1 1 0 1 0 0 0 1 1 1 | |
| $B_{3-2}$ | 0 1 1 0 0 1 1 1 0 1 0 1 0 0 1 1 | FIG. 7A |
| $B_{4-2}$ | 0 0 1 0 0 1 1 0 1 0 1 1 1 0 0 0 | |
| $B_{5-2}$ | 1 0 1 0 1 1 0 0 1 1 1 0 1 0 1 0 | |
| $P_2$ | 1 1 0 0 1 1 1 0 0 0 1 1 0 1 0 0 | |

| | | |
|---|---|---|
| $B_{2-2}'$ | 1 0 1 1 1 0 0 1 0 0 0 1 0 1 1 1 | ↙504 |
| BIT MAP | 0 0 1 0 1 1 1 0 0 1 0 1 0 0 0 0 | FIG. 7B |
| $P_2'$ | 1 1 1 0 0 0 0 0 0 1 1 0 0 1 0 0 | |

| | | |
|---|---|---|
| $B_{1-2}$ | 1 0 1 1 0 1 0 0 0 1 1 1 0 0 1 0 | |
| $B_{2-2}$ | 0 0 0 0 0 0 0 0 0 0 0 0 0 0 0 0 | |
| $B_{3-2}$ | 0 1 1 0 0 1 1 1 0 1 0 1 0 0 1 1 | FIG. 8A |
| $B_{4-2}$ | 0 0 1 0 0 1 1 0 1 0 1 1 1 0 0 0 | |
| $B_{5-2}$ | 1 0 1 0 1 1 0 0 1 1 1 0 1 0 1 0 | |
| $P_2$ | 0 1 1 1 1 0 0 1 0 1 1 1 0 0 1 1 | |

| | | |
|---|---|---|
| $B_{2-2}'$ | 1 0 1 1 1 0 0 1 0 0 0 1 0 1 1 1 | FIG. 8B |
| $P_2'$ | 1 0 1 1 1 0 0 1 0 0 0 1 0 1 1 1 | |

MANAGING REMOVABLE MEDIA IN RAID AND RAIL ENVIRONMENTS

TECHNICAL FIELD OF THE INVENTION

The present invention relates to RAID technology, and in particular, to managing removable media in a RAID or RAIL environment.

BACKGROUND OF THE INVENTION

Redundant storage arrays (Redundant Arrays of Independent/Inexpensive Devices, or RAID) are now commonly used to provide increased data integrity, ensuring that even if data on one of the devices in the array becomes corrupted or the device fails, the data can be recovered or reconstructed. Details of the various RAID levels are well known and will not be described here. However, the present invention is particularly applicable to RAID level 4 and a brief overview of this level will be provided.

RAID-4 relies upon block-interleaved parity for data integrity. FIG. 1A illustrates a single, logical volume of data having twenty contiguous data units or "blocks" of definite and constant size, including, but not limited to, sectors. In FIG. 1B, an array of six storage devices (such as disk drives), devices 1–6, is represented, each device having recording media onto which the logical volume is mapped and recorded. When blocks of data are recorded, a first block $B_1$ is recorded on the first device at a first address, a second block $B_2$ is recorded on the second device at the same address, and the third, fourth and fifth blocks $B_3$, $B_4$ and $B_5$ are recorded on the third, fourth and fifth devices, respectively, at the same address. This is in contrast with RAID-2 and -3 in which each data block is "striped" across several devices. Parity in RAID-4 is calculated bit-by-bit for the five data blocks (such as with an exclusive-OR algorithm) and recorded as a block $P_1$ on the sixth device at the first address. The blocks $B_1$–$B_5$ and $P_1$ are collectively known as the first parity group. Subsequent data and parity blocks are recorded in a like manner as parity groups 2–4 at corresponding second, third and fourth addresses on the devices.

If a data block $B_i$ has been corrupted, or if an entire device is faulty, the data can be reconstructed bit-by-bit from the remaining N−1 data blocks in combination with the associated parity block by reversing the parity calculation process.

It is evident that all of the devices in a parity group should be accessible together. Consequently, the use of removable media (such as magnetic disks or tape or optical disks) in the RAID devices presents a significant management burden. Moreover, there may be instances in which it is desirable to remove one of the pieces of media from a device, take the media to a different location (such as to a separate workstation) and modify one or more blocks of data on the media. While the media is away from the rest of the parity group, the host can, if necessary, continue to access the data on the missing media through a RAID controller which reconstructs the missing data from the remaining media and the associated parity. However, in prior art RAID systems, when the removed media is returned to the RAID array, all of the media forming the parity group must be loaded into respective devices, all of the data thereon read and the parity blocks recalculated and re-recorded.

SUMMARY OF THE INVENTION

In view of the foregoing, it is an object of the present invention to provide a RAID system for removable media in which parity can be updated quickly after removable media has been exported from the RAID environment, modified and then returned.

It is a further object that parity be updated without requiring that all of the media in the relevant parity group be loaded in the RAID system.

These and other objects are achieved by providing a revised RAID-4 configuration (referred to herein as "RAID-4R") in which each piece of media (except the parity media) contains a fully self-describing logical volume. In one embodiment of the invention, a list is maintained identifying those blocks of data which were modified on a particular piece of media. Only the corresponding blocks on the other media in the parity group are read to calculate the new parity, thereby saving the time which would otherwise be required to read all of the data on all of the media in the parity group. In an alternative embodiment, a list can be maintained identifying those bits which were changed on the media. Then, only the corresponding bits of the parity block(s) need be changed, without having to mount any other media in the parity group. A further refinement of MO media is the addition of an indicator that the blocks were previously erased while in the parity group, hence the contents of the blocks themselves identifies the altered bits.

The foregoing and other features and advantages of the invention will be apparent from the following more particular description of preferred embodiments of the invention, as illustrated in the accompanying drawings.

BRIEF DESCRIPTION OF THE DRAWINGS

FIGS. 5A and 5B are schematic illustrations of media in another embodiment of the RAID-4R system of the present invention in which a delta list on each piece of media contains the identity of bits which have been modified;

FIGS. 6A and 6B are schematic illustrations of optical media in still another embodiment of the RAID-4R system of the present invention in which newly recorded data itself serves as a bit map;

FIGS. 7A and 7B illustrate the manner in which a bit map is established in the embodiment of FIGS. 5A and 5B; and FIGS. 8A and 8B illustrate the manner in which newly recorded data becomes a bit map in the embodiment of FIGS. 6A and 6B.

DETAILED DESCRIPTION OF THE INVENTION

Figure 3:
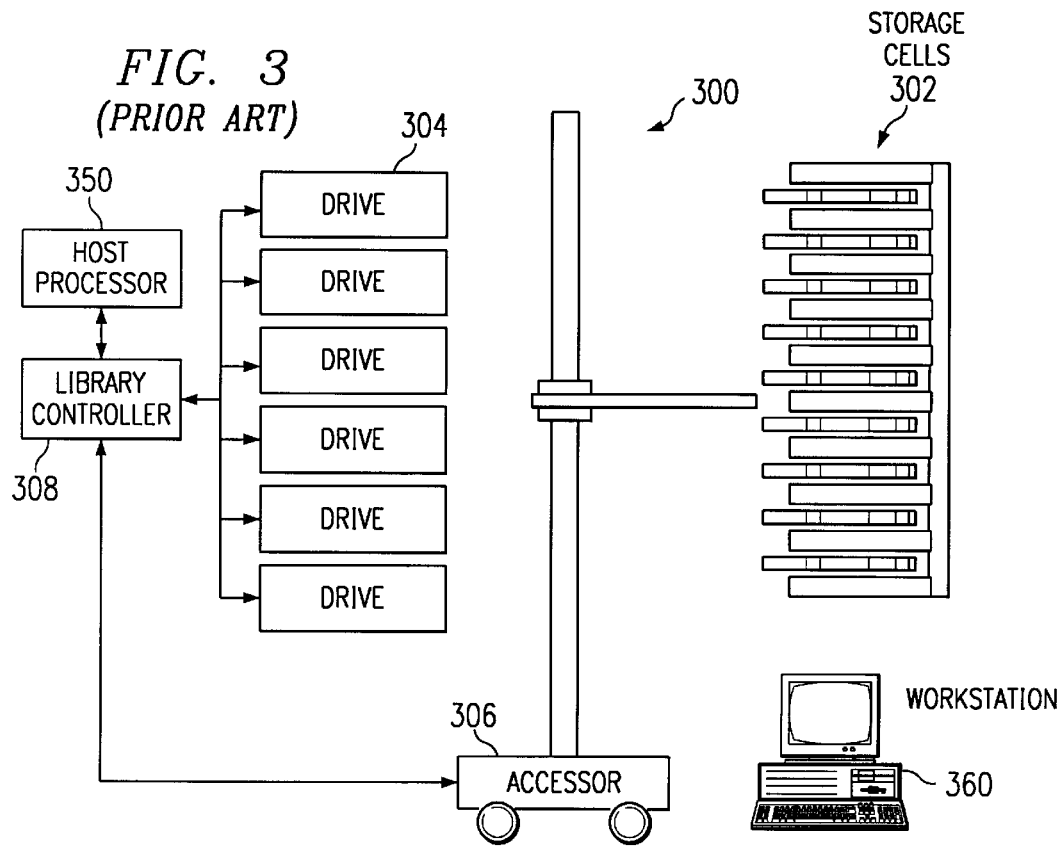
FIG. 3 is a schematic illustration of an automated data storage library in which the present invention can be incorporated.

FIG. 3 is a schematic illustration of an automated data storage library 300 in which the present invention can be incorporated, including an array of storage cells 302 in which removable media (such as magnetic tape cartridges, magnetic disks or optical disk cartridges) is stored, a bank of data drives 304 in which data is written to and read from media, a mechanical accessor 306 which transports media between storage cells 302 and drives 304, and a controller 308 interconnected with the drives 304, the accessor 306 and a host device 350 to/from which data and instructions are transmitted/received. Six drive units are shown in FIG. 3, five for recording user data and one for recording parity.

It will be appreciated that more or fewer drives can be employed and that any of the drives can be used to record parity. The present invention can also be incorporated into a non-automated environment having data drives for removable media or into an environment having multiple libraries (RAIL).

Figure 1A:
FIGS. 1A and 1B illustrate the mapping of a logical volume of data onto physical media in a conventional RAID-4 array system.
Figure 1B:
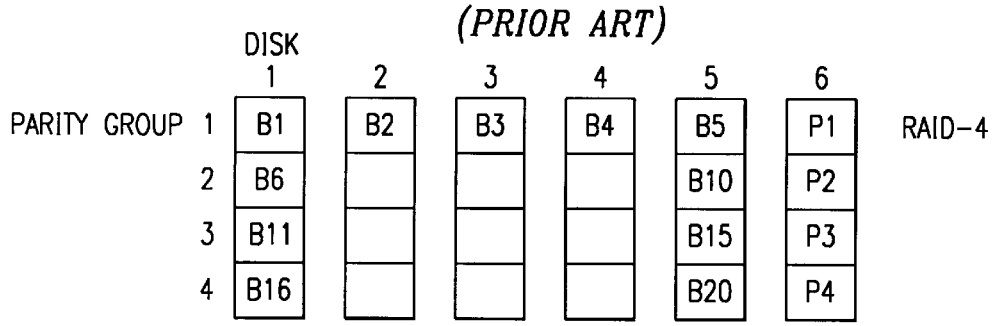
Figure 2A:
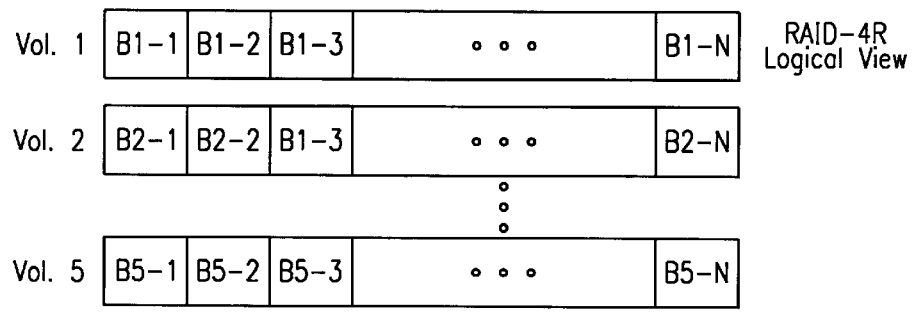
FIGS. 2A and 2B illustrate the placement of data in a RAID-4R array system.
Figure 2B:
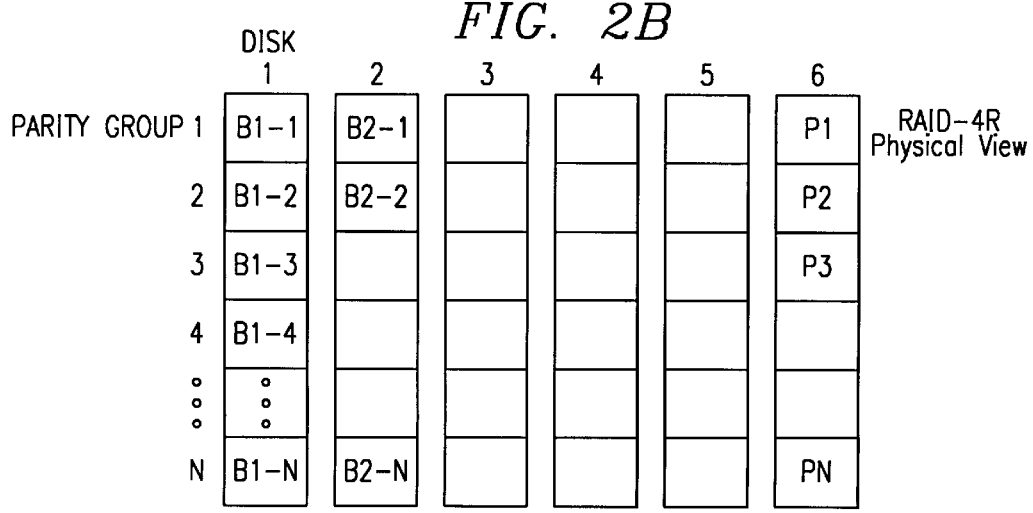

FIG. 2A illustrates five logical volumes of N data blocks each. Each volume, $V_1$–$V_5$, is recorded onto a corresponding piece of media, Disk1–Disk5, as part of a RAID-4R array. Each volume is independent of the other volumes in the array and is fully self-describing. A sixth piece of media, Disk6, contains parity blocks $P_1$–$P_N$, derived from the blocks of data in the corresponding parity groups.

Figure 4A:
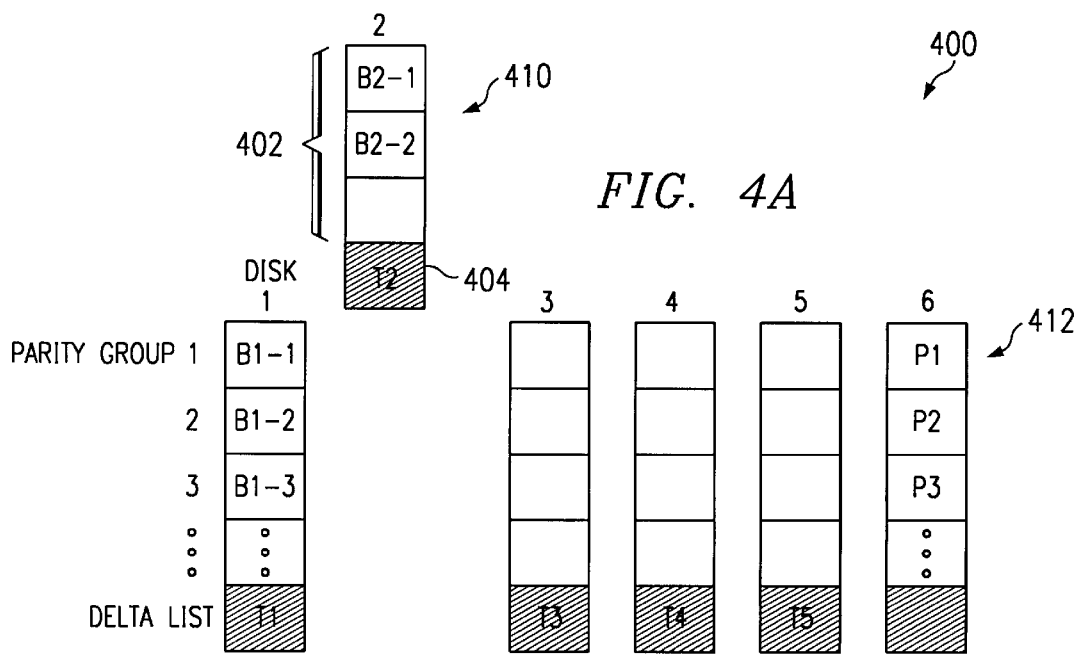
FIGS. 4A and 4B are schematic illustrations of media in one embodiment of the RAID-4R system of the present invention in which a delta list on each piece of media contains the identity of data blocks which have been modified.
Figure 4B:
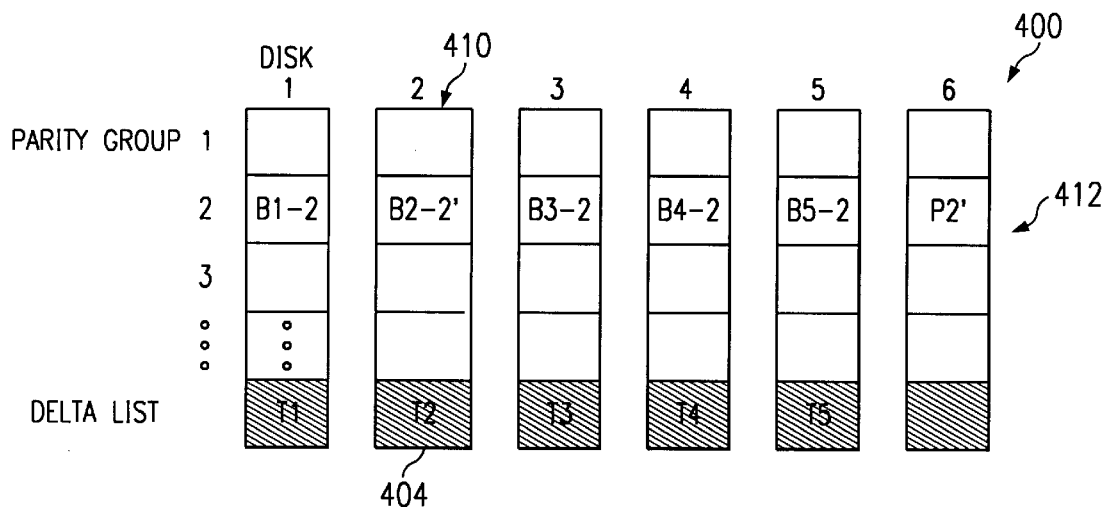

FIG. 4A illustrates a RAID array 400 with a suggested media format in which data (user data or parity) is recorded in a data area 402 and data update information is recorded in a delta list area 404 of each piece of media, such as media 410, in the array 400. Parity group 2 is comprised of data blocks $B_{1-2}$–$B_{5-2}$ and parity block $P_2$. When a data block, such as data block $B_{2-2}$ on the second piece of media 410, is to be modified, the media 410 can be retained in the library 300 or it can be exported, as shown, from the library 300 and mounted in a workstation 360 which is separate from the library 300. After the data block $B_{2-2}$ has been modified, the delta list 404 on the media 410 is created, and recorded on the media 410, identifying those blocks on the media which were modified (in this illustration, only $B_{2-2}$ would be identified in the delta list 404). If the media 410 had been exported from the library 300, it can subsequently be returned to the library (FIG. 4B). All of the other media in the parity group, including the media 412 on which the parity block is located, are mounted in the drives 304. The controller 308 directs that the modified data block $B_{2-2}'$ and the corresponding data blocks $B_{1-2}$ and $B_{3-2}$–$B_{5-2}$ on the other media be read and a new parity block $P_2'$ be calculated and recorded. By employing the delta list, it is not necessary for all of the data blocks on all of the media to be read or for all of the parity blocks to be recalculated as would be required in a conventional RAID-4 system; only those parity blocks corresponding to modified data blocks need to be modified.

Figure 5A:
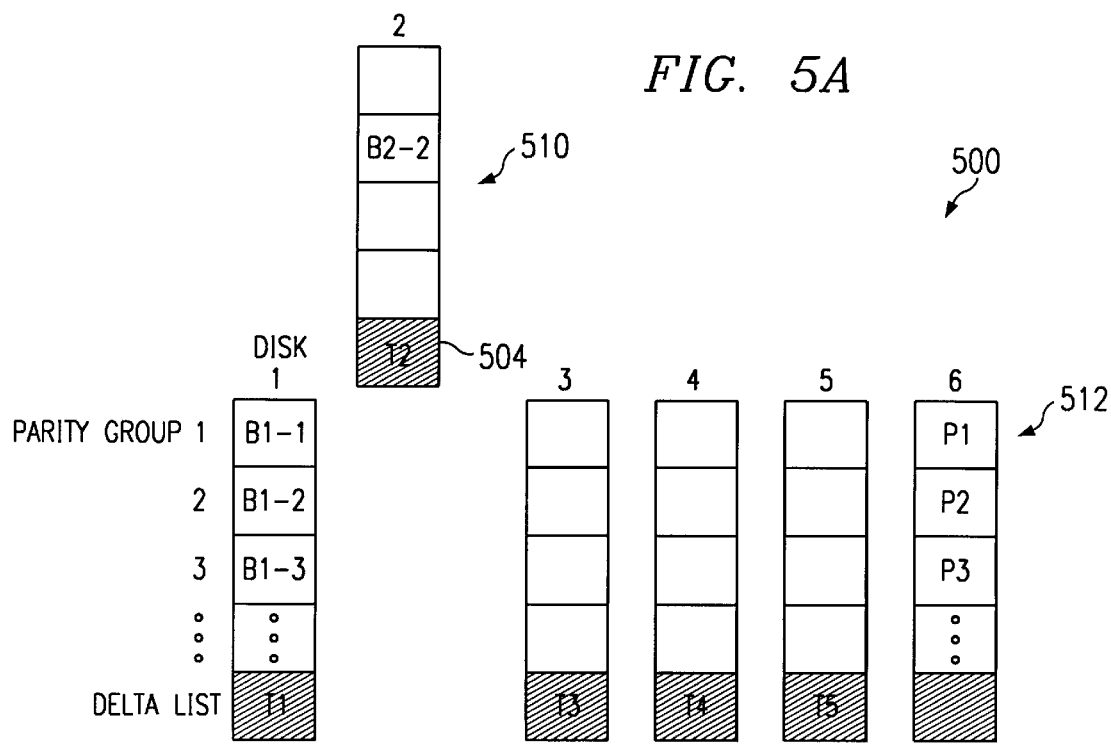

Media mounting time is reduced further in another embodiment (array 500 in FIGS. 5A and 5B) by establishing a bit map 504 indicating which bits were changed in the modified data block $B_{2-2}'$ on the media 510 (see also FIGS. 7A and 7B). When the parity block $P_2$ is to be updated, only the modified media 510 and the parity media 512 need to be mounted (FIG. 5B). (The modified media 510 and the parity media 512 can be mounted in the library 300 or both can be mounted in the stand-alone workstation 360.) By examining the bit map 504 on the modified media 510, the controller 308 (or the workstation 360) can then selectively change only those bits in the parity block $P_2$ which correspond to changed bits in the modified data block $B_{2-2}'$. The remaining media in the parity group does not have to be mounted.

In some magneto-optical (MO) systems, even the bit map is unnecessary (FIGS. 6A and 6B). When a block of data is to be recorded in a target area in a conventional MO system (as opposed to one which provides direct-overwrite capability), any data which had previously been recorded in the target area must first be erased. After the erase pass is completed, all of the bits in the target area are in the same state (representing, for example, all "zeros"). In the next pass, the new or modified data is recorded in the target area, changing some of the bits from the erased state to the opposite state (for example, to "ones") while leaving the remaining bits in the erased (zero) state. When the target area is erased before actually being needed (in an operation referred to as "pre-erase"), the erased area may be included in a parity group when parity is calculated, as illustrated as block $B_{2-2}$ in FIG. 8A. When data is subsequently recorded to the target area, the data itself serves as a bit map for the parity update: only those bits in the parity block $P_2$ which correspond to the newly recorded bits in the data block $B_{2-2}'$ need to be changed (FIG. 8B). Consequently, when updating parity, the controller 308 can examine the updated data block $B_{2-2}'$ for only those bits in a specified state (the non-erased state) and change the state of the corresponding bits in the parity block $P_2$ without requiring the use of space on the media for a separate delta list.

A delta list is also not required when the recordable media is write-once, read-many (WORM) optical media in which data is always recorded onto an unused target in which all of the bits are in a predetermined known state. As in the embodiment provided for pre-erased MO systems, any newly recorded data block itself serves as a map of bits which are in a different (non-erased) state.

While the invention has been particularly shown and described with reference to preferred embodiments thereof, it will be understood by those skilled in the art that various changes in form and details may be made therein without departing from the spirit and scope of the invention.

What is claimed is:

1. A storage system for removable storage media, comprising:

a plurality m of data storage devices for storing blocks of data;

a parity storage device;

a storage controller interconnected with said m storage devices, said parity storage device and a host device, said storage controller including:

means for receiving a plurality of logical volumes $V_1$–$V_m$ of user data to be recorded onto corresponding pieces of removable media $R_1$–$R_m$, each of the logical volumes $V_1$–$V_m$ having a plurality of data blocks including at least a first data block $B_q$, where "q" is a logical volume number between 1 and m, inclusive;

means for computing a first parity block $P_1$ from the first data blocks $B_1$–$B_m$ such that any first data block $B_j$ can be reconstructed from the remaining m−1 first data blocks and the first parity block $P_1$, the blocks $B_1$–$B_m$ and $P_1$ forming a first parity group; and means for directing that each of the first data blocks be recorded onto a corresponding one of m pieces of removable media $R_1$–$R_m$ mounted in said m data storage devices and that the parity block $P_1$ be recorded onto a corresponding piece of media $R_p$ mounted in said parity storage device, each of said pieces of media $R_1$–$R_m$ and $R_p$ being capable of storing a plurality of blocks of data;

means for detecting when one of the first data blocks $B_j$ recorded on one of the m pieces of removable media $R_j$ has been modified;

means, in response to said means for detecting, for recording the identity of those bits in the modified first data block $B_j$ which were modified; and means for updating the parity block $P_1$ using data stored on the media $R_j$ without re-computing the parity block $P_1$ from all blocks of data on all of the pieces of media $R_1$–$R_m$, said means for updating further including means for changing the state of only those bits in the parity block $P_1$ which correspond to the modified bits in the modified first data block $B_j$.

2. The storage system of claim 1, wherein:

said storage controller further comprises means for, in response to said means for detecting, recording the identity of the modified first data block $B_j$ in a delta list; and said means for updating the parity block $P_1$ comprises:
means for reading the delta list from the media $R_j$ to identify the modified first data block $B_j$;
means for directing that a modified parity block $P_1'$ be calculated from each first data block $B_1$–$B_m$, including $B_j$, in the first parity group; and
means for recording the modified parity block $P_1'$ onto the media $R_p$.

3. The storage system of claim 1, further comprising:
a plurality of media storage cells;
a media accessor for transporting media between said storage cells and said data and parity storage devices.

4. The storage system of claim 1, further comprising:
a plurality m of automated storage libraries, each comprising:
a first plurality of media storage cells for retaining removable media, including one of the pieces of removable media $R_1$–$R_m$;
a first media accessor for transporting media between said first plurality of storage cells and said one of said m data storage devices housed within said library; and
another automated storage library, comprising:
a second plurality of media storage cells for retaining removable parity media on which parity data, including the parity block $P_1$, is recordable;
a second media accessor for transporting the parity media between said second plurality of storage cells and said parity storage device housed within said other automated storage library.

5. An array of automated library systems for removable storage media, comprising:
a plurality m of automated storage and retrieval libraries;
a plurality m of data storage devices, one of said data storage devices housed in each of said m libraries;
a parity storage device housed in an m+1th library;
a storage controller interconnected to each of said m+1 libraries and a host device, said storage controller including:
means for receiving a plurality of logical volumes $V_1$–$V_m$ of user data to be recorded onto corresponding pieces of removable media $R_1$–$R_m$, each of the logical volumes $V_1$–$V_m$ having a plurality of data blocks including at least a first data block $B_q$, where "q" is a logical volume number between 1 and m, inclusive;
means for computing a first parity block $P_1$ from the first data blocks $B_1$–$B_m$ such that any first data block $B_j$ can be reconstructed from the remaining m−1 first data blocks and the first parity block $P_1$, the blocks $B_1$–$B_m$ and $P_1$ forming a first parity group; and
means for directing that each of the first data blocks be recorded onto a corresponding one of m pieces of removable media $R_1$–$R_m$ mounted in said m data storage devices and that the parity block $P_1$ be recorded onto a corresponding piece of media $R_p$ mounted in said parity storage device, each of said pieces of media $R_1$–$R_m$ and $R_p$ being capable of storing a plurality of blocks of data;
means for detecting when one of the first data blocks $B_j$ recorded on one of the m pieces of removable media $R_j$ has been modified;
means, in response to said means for detecting, for recording the identity of those bits in the modified first data block $B_j$ which were modified; and
means for updating the parity block $P_1$ using data stored on the media $R_j$ without re-computing the parity block $P_1$ from all blocks of data on all of the pieces of media $R_1$–$R_m$, said means for updating further including means for changing the state of only those bits in the parity block $P_1$ which correspond to the modified bits in the modified first data block $B_j$.

6. The storage system of claim 5, wherein:

said storage controller further comprises means for, in response to said means for detecting, recording the identity of the modified first data block $B_j$ in a delta list; and said means for updating the parity block $P_1$ comprises:
means for reading the delta list from the media $R_j$ to identify the modified first data block $B_j$;
means for directing that a modified parity block $P_1'$ be calculated from each first data block $B_{1-Bm}$, including $B_j$, in the first parity group; and
means for recording the modified parity block $P_1'$ onto the media $R_p$.

7. A program storage device readable by a computer, tangibly embodying a program of instructions executable by the computer, to perform steps for updating parity in a removable media RAID device, the RAID device having: a plurality m of data storage devices; a parity storage device; a storage controller interconnected with the m storage devices, the parity storage device and a host device; the instructions comprising steps for:
receiving a plurality of logical volumes $V_1$–$V_m$ of user data to be recorded onto corresponding pieces of removable media $R_1$–$R_m$, each of the logical volumes $V_1$–$V_m$ having a plurality of data blocks including at least a first data block $B_q$, where "q" is a logical volume number between 1 and m, inclusive;
computing a first parity block $P_1$ from the first data blocks $B_1$–$B_m$ such that any first data block $B_j$ can be reconstructed from the remaining m−1 first data blocks and the first parity block $P_1$, the blocks $B_1$–$B_m$ and $P_1$ forming a first parity group;
recording each of the first data blocks onto a corresponding one of m pieces of removable media $R_1$–$R_m$ mounted in said m data storage devices and recording the parity block $P_1$ onto a corresponding piece of media $R_p$ mounted in said parity storage device, each of said pieces of media $R_1 R_m$ and $R_p$ being capable of storing a plurality of blocks of data;
detecting when one of the first data blocks $B_j$ recorded on one of the m pieces of removable media $R_j$ has been modified;
updating the parity block $P_1$ using data stored on the media $R_j$ without re-computing the parity block $P_1$ from all blocks of data on the media $R_1$–$R_m$;
in response to said detecting step, recording the identity of those bits in the modified first data block $B_j$ which were modified; and changing the state of only those bits in the parity block $P_1$ which correspond to the modified bits in the modified first data block $B_j$.

8. The program storage device of claim 7, wherein:

the instructions further comprise the step of, in response to said detecting step, recording the identity of the modified first data block $B_j$ in a delta list; and said updating step comprises:

reading the delta list from the media $R_j$ to identify the modified first data block $B_j$;

directing that a modified parity block $P_1'$ be calculated from each first data block $B_1$–$B_m$, including $B_j$, in the first parity group; and recording the modified parity block $P_1'$ onto the media $R_p$.

9. In a machine-executed method of operating a RAID device for removable media, the RAID device having: a plurality m of data storage devices; a parity storage device; a storage controller interconnected with the m storage devices, the parity storage device and a host device; including the machine-executed steps of:

receiving a plurality of logical volumes $V_1$–$V_m$ of user data to be recorded onto corresponding pieces of removable media $R_1$–$R_m$, each of the logical volumes $V_1$–$V_m$ having a plurality of data blocks including at least a first data block $B_q$, where "q" is a logical volume number between 1 and m, inclusive;

computing a first parity block $P_1$ from the first data blocks $B_1$–$B_m$ such that any first data block $B_j$ can be reconstructed from the remaining m–1 first data blocks and the first parity block $P_1$, the blocks $B_1$–$B_m$ and $P_1$ forming a first parity group;

recording each of the first data blocks onto a corresponding one of m pieces of removable media $R_1$–$R_m$ mounted in said m data storage devices and recording the parity block $P_1$ onto a corresponding piece of media $R_p$ mounted in said parity storage device, each of said pieces of media $R_1$–$R_m$ and $R_p$ being capable of storing a plurality of blocks of data;

detecting when one of the first data blocks $B_j$ recorded on one of the m pieces of removable media $R_j$ has been modified;

updating the parity block $P_1$ using data stored on the media $R_j$ without re-computing the parity block $P_1$ from all blocks of data on the media $R_1$–$R_m$;

in response to said detecting step, recording the identity of those bits in the modified first data block $B_j$ which were modified; and changing the state of only those bits in the parity block $P_1$ which correspond to the modified bits in the modified first data block $B_j$.

10. In the machine-executed method of claim 9, wherein:

in response to said detecting step, recording the identity of the modified first data block $B_j$ in a delta list; and said updating step comprises:

reading the delta list from the media $R_j$ to identify the modified first data block $B_j$;

directing that a modified parity block $P_1'$ be calculated from each first data block $B_1$–$B_m$, including $B_j$, in the first parity group; and recording the modified parity block $P_1'$ onto the media $R_p$.

11. In the machine-executed method of claim 9, further comprising the steps of, after said recording step:

removing the piece of removable media $R_j$ from one of the m storage devices;

mounting the piece of removable media $R_j$ in a storage device outside of the RAID device;

modifying the first data block $B_j$; and returning the piece of removable media $R_j$ to one of the m storage devices.

12. A storage system for removable optical media, comprising:

a plurality m of optical storage devices for storing blocks of data;

a parity storage device;

a storage controller interconnected with said m optical storage devices, said parity storage device and a host device, said storage controller including:

means for receiving a plurality of logical volumes $V_1$–$V_n$ of user data to be recorded onto corresponding pieces of optical media $R_1$–$R_n$, each of the logical volumes $V_1$–$V_n$ having a plurality of data blocks including at least a first data block $B_q$, where n<m and "q" is a logical volume number between 1 and n, inclusive;

means for computing a first parity block $P_1$ from the first data blocks $B_1$–$B_n$ and from an erased first data block $B_m$ such that any first data block $B_j$ can be reconstructed from the remaining m–1 first data blocks and the first parity block $P_1$, the blocks $B_1$–$B_m$ and $P_1$ forming a first parity group;

means for directing that each of the first data blocks $B_1$–$B_m$ be recorded onto a corresponding one of m pieces of optical media $R_1$–$R_m$ mounted in said m data storage devices and that the parity block $P_1$ be recorded onto a corresponding piece of media $R_p$ mounted in said parity storage device, each of said pieces of media $R_1$–$R_m$ and $R_p$ being capable of storing a plurality of blocks of data;

means for receiving an m-th logical volume $V_m$ of user data to be recorded onto the m-th piece of removable media $R_m$, the logical volume $V_m$ having at least a first data block $B_m$; and means for updating the parity block $P_1$ using the parity block $P_1$ and a bit map comprising bits in the m-th logical volume $V_m$ without re-computing the parity block $P_1$ from all blocks of data on all of the pieces of media $R_1$–$R_m$, the bit map identifying those bits in the first data block $B_m$ which were modified, said means for updating further including means for changing the state of only those bits in the parity block $P_1$ which correspond to the modified bits in the modified first data block $B_m$.

* * * * *